Figure 1:
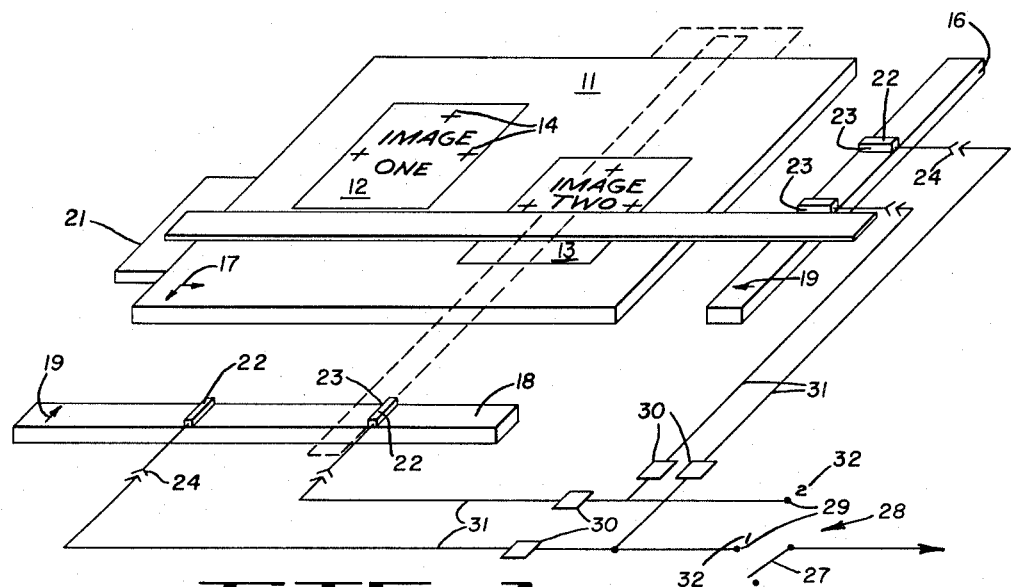

Nov. 28, 1961     H. G. JOHNSON     3,010,376
METHOD AND APPARATUS FOR PHOTOCOMPOSING CONTROL
Filed Feb. 5, 1959     6 Sheets-Sheet 1

INVENTOR.
Henry G. Johnson
BY
William D. Hager
ATTORNEY

Nov. 28, 1961 H. G. JOHNSON 3,010,376
METHOD AND APPARATUS FOR PHOTOCOMPOSING CONTROL
Filed Feb. 5, 1959 6 Sheets-Sheet 3
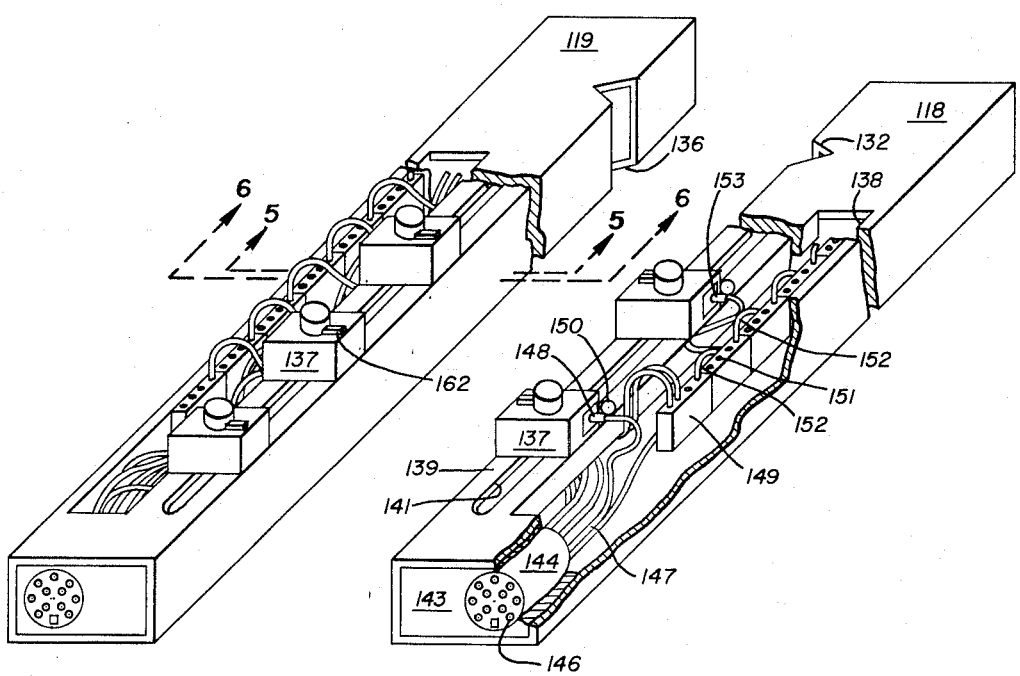
FIG. 4.
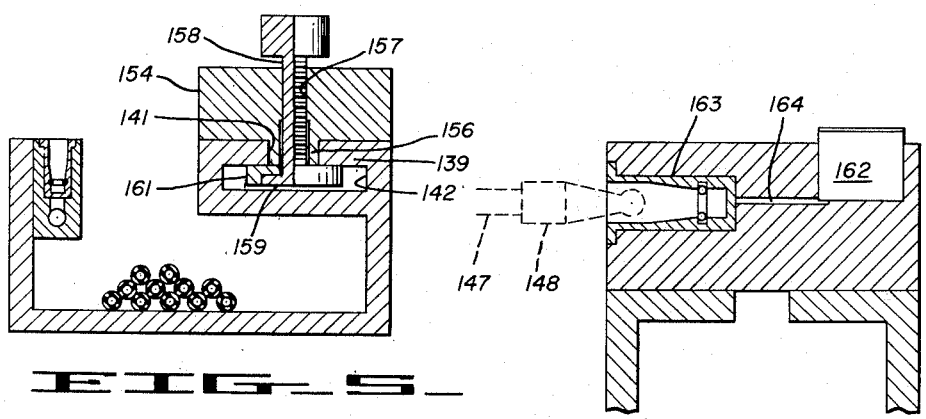
FIG. 5.
FIG. 6.
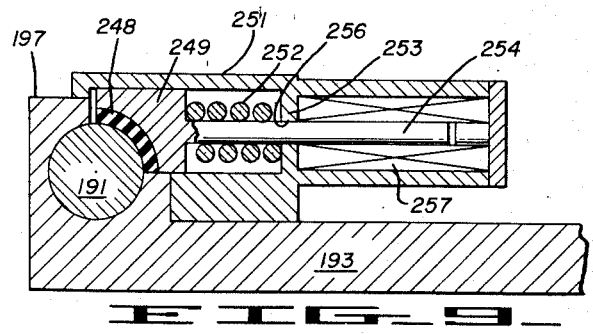
FIG. 9.
INVENTOR.
Henry G. Johnson
BY
William D. Hager
ATTORNEY

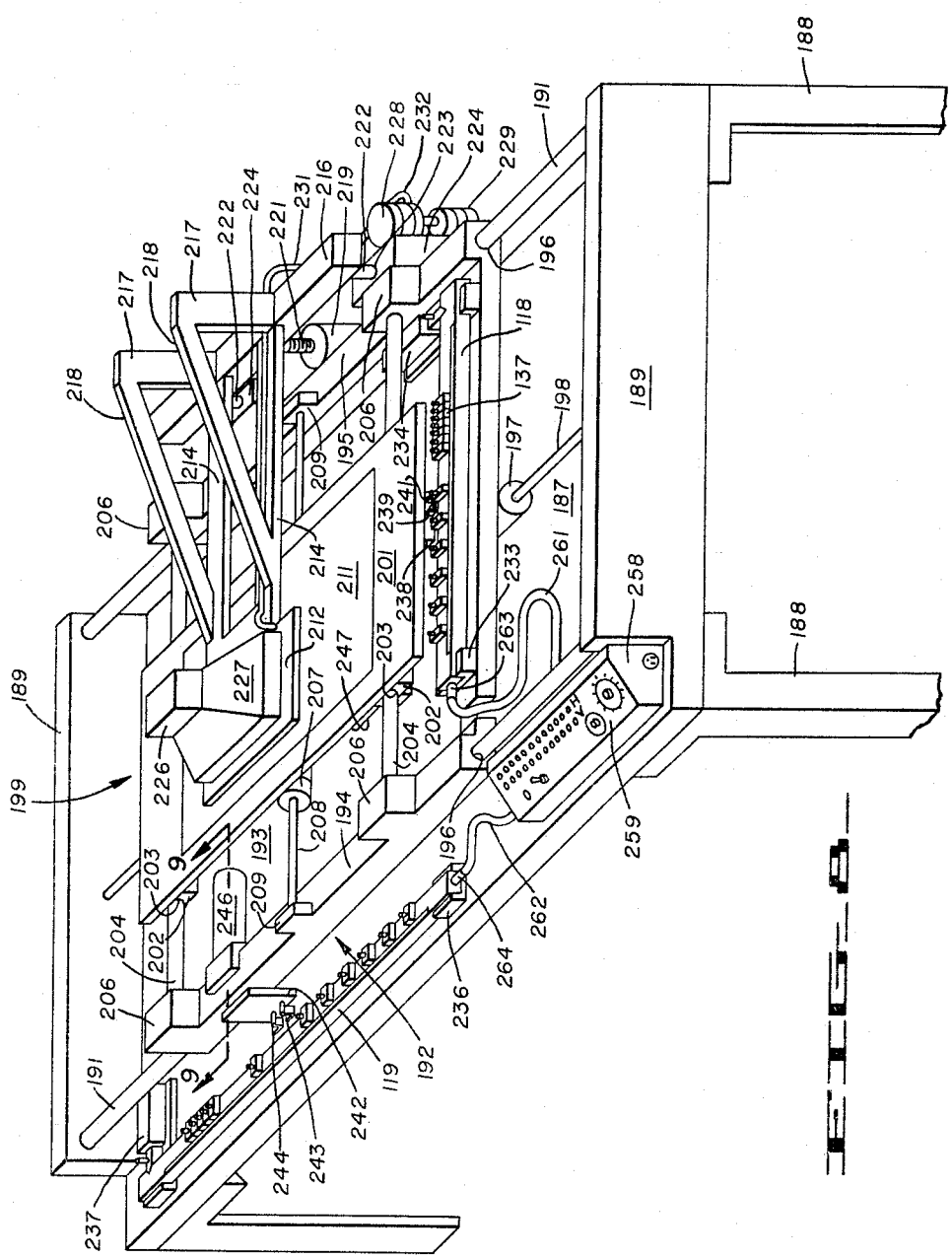

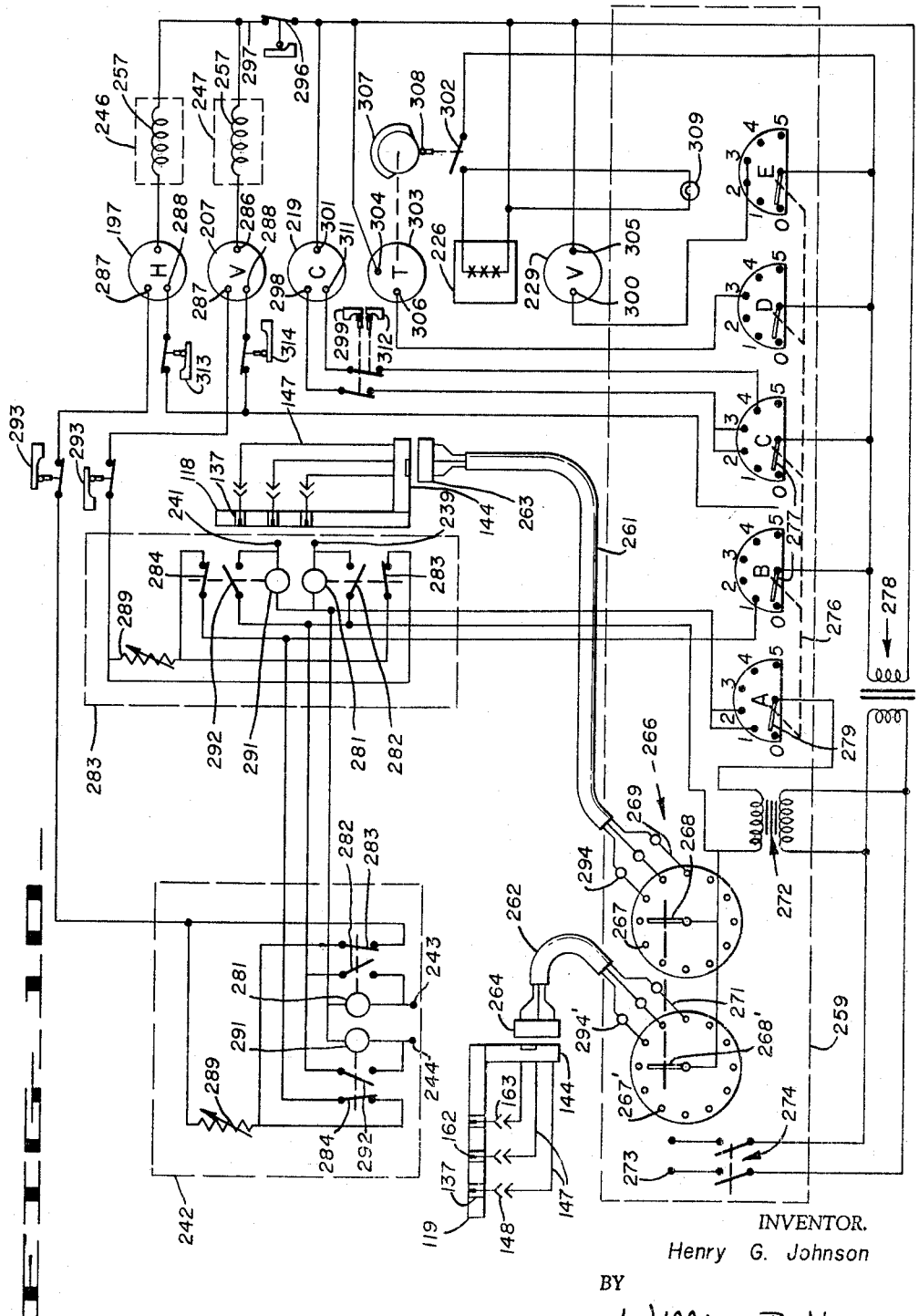

United States Patent Office 3,010,376
Patented Nov. 28, 1961

3,010,376
METHOD AND APPARATUS FOR PHOTO-COMPOSING CONTROL
Henry G. Johnson, 2139 Rose St., Berkeley 9, Calif.
Filed Feb. 5, 1959, Ser. No. 791,440
16 Claims. (Cl. 95—73)

The present invention relates to the printing arts and more particularly to a method and means for facilitating photo-mechanical composing operations. More specifically this invention provides a superior method and apparatus for identifying and recording the precise position of images in a layout thereof, for transferring such image position information to a photocomposing machine, and for effecting a rapid, automatic, and error-free operation of the photocomposing machine to produce an exact duplication of the layout of images on one or more printing plates.

The history of the printing crafts is one of increasing mechanization aimed at increasing the rate at which printed matter can be reproduced and directed towards increasing the accuracy and variety of the reproductions. Among the later and particularly useful developments in this field is the photocomposing machine which apparatus may be broadly described as a precision mechanism for effecting the measured movement of a photographic negative relative to an actinically sensitive printing plate. By providing a means for rigidly controlling and measuring such motion, an image of the negative can be burned at any precise position on the plate that is desired. The photocomposer thus provides an accurate mechanical control of the placement of images on a printing plate, the obtainable precision being far greater than that of earlier methods which depended, to a large extent, upon the visual acuity and judgment of a craftsman.

The need for extreme accuracy in the positioning of images on a printing plate arises from several causes, a prominent one being the practice of using several plates to print a single reproduction. In the halftone color process, for example, several plates are used each bearing specific color components of the same image. Obviously the various plates must be identical with respect to the position of the image thereon or the various colors making up the image on the finished reproduction will not be in register thereby causing a loss of detail and a general unattractiveness. While some adjustment for lack of register between the various plates can be made at the press in those instances where a single image is present on the plates, no such adjustment can always be made where a number of images are on the plates since adjustment of a plate to bring one particular image into register may throw the remaining images on the plate out of register. Thus in the production of plates carrying several separate images, a precision composing device such as a photocomposer is a virtual necessity.

In spite of the great advance brought about by the introduction of the photocomposing machine, certain of the operations currently conducted thereon are readily susceptible to error and require an extreme degree of operator attention, time and skill. A primary point at which this undesirable condition prevails derives from the form in which the image position data is customarily given to the photocomposer operator. Data on precisely where to position the image, or images, on the plate is given to the operator in the form of a listing of numbers each of which is the desired displacement, usually to one-thousandth of an inch, of the centerpoint of each image from a fixed reference, such displacements being given for both the horizontal and vertical directions on the plate. Inasmuch as the photocomposer is provided with measuring scales and generally with a vernier attachment, the operator can then traverse the plate relative to the negative the specified distances and make an exposure to produce a latent image on the plate at the specified location.

Carrying the foregoing procedure back an additional step, the manner in which the numerical image position data is itself determined will be considered. Generally the arrangement of images which is to be put on the plate is pre-arranged on a layout table. Such table, in its simplest form, may be an ordinary drawing board and T-square but is preferably a more elaborate facility having such conveniences as a translucent lighted surface, straight edges mounted to move across the surface in a constantly parallel alignment with the boundaries thereof, and scales and vernier accessories with which the displacement of the straight edges from a fixed reference point can be accurately determined. Thus a layout of the desired arrangement is made upon the layout table and the aforementioned numerical listing of individual image displacements, which is essentially a set of instructions for the photocomposer operator, is prepared by accurately measuring the same on the layout table. It should be understood that in instances where the layout is a simple one, the use of the layout table may be dispensed with and the preparation of numerical instructions for the photocomposer operator may be done by a calculation of the same. In either case, the data is converted to a series of numbers, which are generally expressed to three decimal places, to provide maximum precision.

Inasmuch as the transfer of data between the layout table and photocomposer has heretofore been been made in numerical form as described above, serious possibilities of error and mistake have been present. Wherever a series of numbers expressed to several significant figures must be prepared and read, inadvertent errors will occasionally be made which errors can occur in the writing of the numbers or in the reading thereof. In the photocomposing procedures under discussion, error possibilities are not confined to the acts of writing down and reading the numbers but may equally well occur by misreading of the scales and verniers on the layout table or later at the photocomposer. In practice each class of error has been found to occur occasionally and the consequences of even a minor error particularly in a complex layout, can be extremely costly both financially and in terms of delay.

In addition to the occasional occurrence of errors, the preparation, processing, and use of numerical data is inherently a tedious task for personnel and one which may frequently be time consuming. Where such data must be determined and then subsequently used by the careful reading of scales and verniers a degree of visual strain is introduced and the operations must be performed carefully and slowly if accurate results are to be insured.

Still a further disadvantage of reducing such data to numerical form arises from the fact that such data must frequently be stored for use in a future run. The storage of data on paper forms requires many safeguards. Job specifications on paper are easily misplaced or misfiled, are subject to fading, obliteration by stains, accidental tearing, and must be carefully protected from such hazards as fire. Moreover the short-cuts and terminology employed by one individual may prove to be confusing, or even indecipherable, to later personnel.

An indirect, but extremely significant, disadvantage of the use of numerical instructions in photocomposer operations is that the realization of automatic operation of the machine is effectively prevented. As long as numerical data is used, and scales and verniers read to control motion of the photocomposer, no mechanical replacement for the judgment and physical manipulations of the operator is practical. The operator is thus a working element of the machine where preferably his function should be that of supervising and monitoring an automatic operation. While in theory the numerical data might be encoded on punched cards, or the equivalent, and a digital computer used to control the photocomposer, such a solution is extremely expensive and would require that an inordinate amount of intricate equipment be added to the already complex photocomposing machine.

Thus the preparation and use of image position information in numerical form is a feature of the photocomposing process, as currently practiced, which gives rise to diverse disadvantages, and which prevents the realization of automatic operation of the photocomposer. It is accordingly the purpose of this invention to provide a highly superior procedure for recording image position information, for storing the same, and for subsequently utilizing the stored information to effect a highly automatic operation of a photocomposer. As a basis for accomplishing the foregoing, this invention substitutes a mechanical analog for the numerical listing of data heretofore employed.

As a starting point, this invention makes use of a long inelastic guide element which is disposed along a boundary of the layout in precisely fixed relationship thereto. The position of the various images making up the layout are then marked along the length of the guide through the use of a T-square or equivalent. Such marking can be made in a variety of ways but for reasons which will hereinafter become evident is preferably done by clamping stop elements at appropriate positions on the guide. Generally two such guides are employed in order to record image positions in both the vertical and horizontal directions.

To duplicate the layout on a printing plate, the guides are transferred to the photocomposing machine and mounted thereon in positions corresponding to the positions formerly occupied on the layout table. Motion of the photocomposer beds is then controlled in accordance with the stops, or other marking, on the guides. Thus a particular pair of stops, one on each of the two guides, will be indicative of the proper position of the first image to be burned on the plate and accordingly the bed of the photocomposer is traversed in the horizontal direction until an element moving with the bed encounters the proper stop on the horizontal guide. Vertical positioning is similarly accomplished. When the beds have thus been properly positioned, the first image is burned on the plate and the foregoing process is carried out again to bring the second image position in register with the negative. In this manner any number of images can be accurately placed on the plate and no numerical data, or reading of scales, is required. Inasmuch as the image position data is implicit in the positioning of the stops on the guides, little possibility of error exists, particularly since additional means may be provided to insure that the proper pair of stops have been utilized to fix a given image position. As one means for assuring that the proper pair of stops have been paired, the invention includes electrical circuitry with which the particular pair of stops indicative of a particular image position can be energized and with which the sensing elements which move with the photocomposer beds can be made to detect the energized stops. Additional circuitry, operating from the information stored in the guides, can be used to make the photocomposer highly automatic, the sole functions of the operator becoming that of mounting the guides on the machine, mounting the negatives and plates, and setting switches.

The foregoing system is relatively free from the possibility of error and results in a very considerable saving in time and effort. The obtainable precision, moreover, is not limited by the accuracy with which scales can be read. As a still further advantage, the guide elements with attached stops can be stored as a virtually indestructible record of the data and may be subsequently re-used in future runs of the same job.

It is therefore the object of this invention to facilitate the photo-mechanical preparation of printing plates.

It is the object of this invention to provide a superior method and means for determining and recording the position of images in a layout thereof, for transferring such data to a photocomposing machine, and for operating said photocomposing machine to reproduce the layout of images on a sensitized printing plate.

It is an important object of this invention to provide for the automatic operation of a photocomposing machine.

It is a further object of this invention to provide a method and apparatus for effecting an error free transfer of image position information between a layout table and a photocomposing machine.

It is an object of this invention to eliminate the necessity for reading scales and vernier devices and the necessity of determining, recording, storing, and interpreting numerical data in the operation of a photocomposing machine by providing a mechanical analog for the numerical data.

It is still a further object of the invention to provide an improved means for recording the position of images in a layout thereof for the purpose of controlling a photocomposer to duplicate the layout of images on a sensitized printing plate, the novel means for recording such information being of a form which can be conveniently stored and re-used.

It is another object of the invention to provide a mechanism for controlling the operation of a photocomposer to produce a predetermined layout of images on a printing plate which mechanism includes electrical circuitry for automating the operation of the photocomposer and for insuring against the possibility of error in the placement of images on the plate.

It is a general object of this invention to automate, expedite, economize, and render error-free, the use of photocomposing machines and associated equipment and to lessen the degree of skill, effort, and prolonged close attention required for the operation of the same.

The invention, both as to its organization and method of operation, together with further objects and advantages thereof, will be better understood by reference to the following specification taken in conjunction with the accompanying drawings, in which:

FIGURE 1 is a schematic perspective view illustrating a method and means by which the position of images in a layout may be recorded without resort to scales, verniers, and the use of numerical data.

Figure 2:
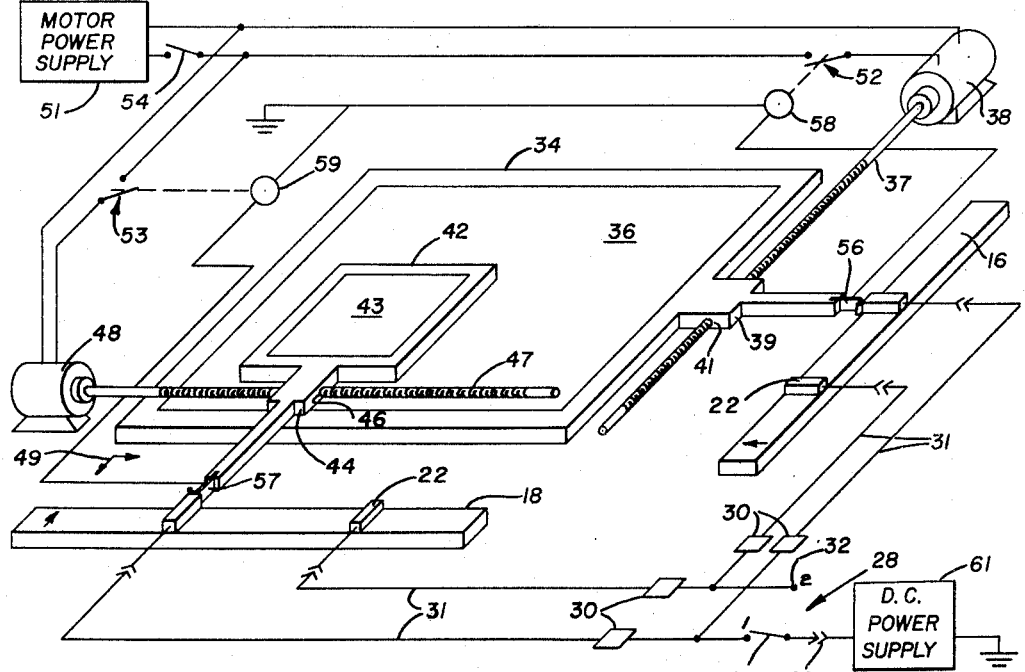
Figure 3:
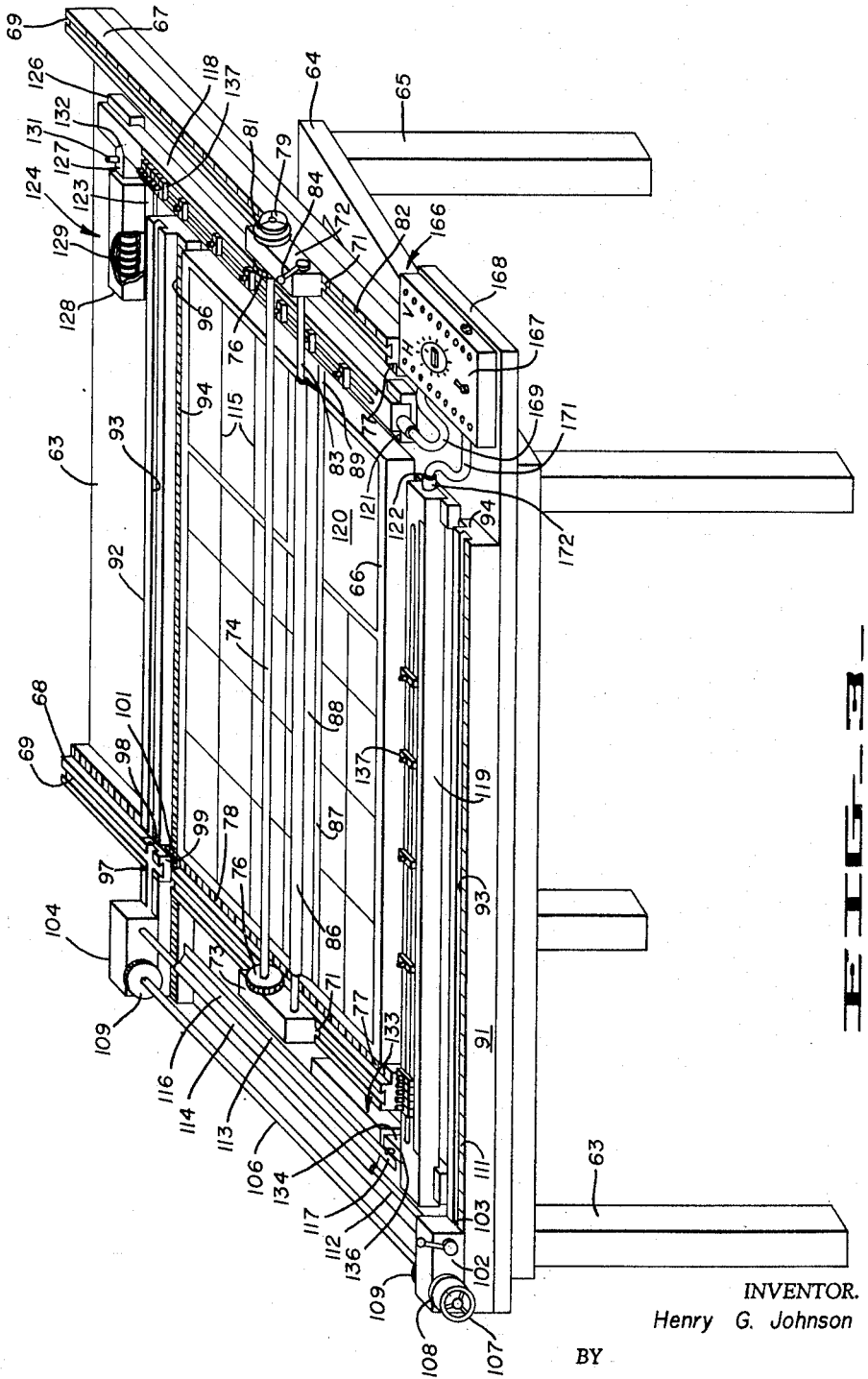
Figure 7:
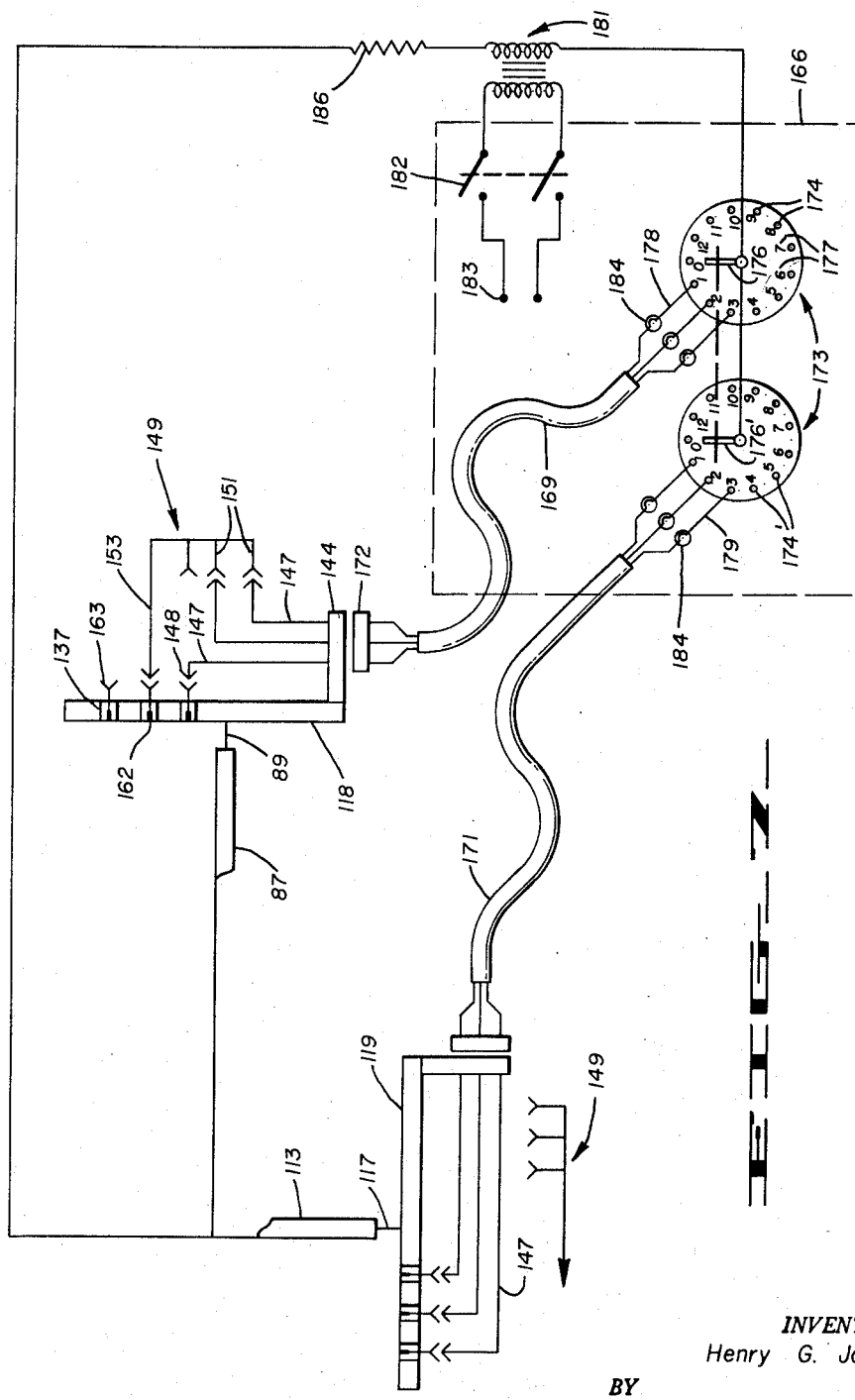

FIGURE 2 is a schematic perspective view showing the image position recording means of FIGURE 1 transferred to a photocomposer and illustrating the use of the recording means in controlling the photocomposer to duplicate the layout on a printing plate, FIGURE 3 is a perspective view of a preferred form of layout table modified and adapted in accordance with the invention and provided with means for electromechanically storing the layout data needed for operation of a photocomposing machine to reproduce the layout on a printing plate, FIGURE 4 is a view of the layout data storage means removed from the layout table of FIGURE 3 for transfer to the photocomposer, with portions of the structure broken away to show interior components thereof, FIGURE 5 is a cross section view of the data storage means taken along line 5—5 of FIGURE 4, FIGURE 6 is an additional cross section view of a portion of the data storage means taken along line 6—6 of FIGURE 4, FIGURE 7 is a schematic diagram showing electrical circuitry at the layout table of FIGURE 3, FIGURE 8 is a perspective view of a photocomposing machine having electromechanical means for detecting the layout data stored in the apparatus of FIGURE 4 and operating in an automatic manner to duplicate the layout on a printing plate, FIGURE 9 is a longitudinal section view of a photocomposer carriage motion braking means, such view being taken along line 9—9 of FIGURE 8, and FIGURE 10 is a schematic diagram of the electrical circuitry associated with the photocomposer shown in FIGURE 8.

Referring now to the drawing, and more particularly to FIGURE 1 thereof, certain of the basic features of the invention will first be described with reference to a simplified application thereof, the detailed structure of an additional embodiment of the invention being hereinafter given.

As a first step in the photocomposing process, an arrangement of images on a surface such as a drawing board 11 is made, the arrangement being that which is to be put onto a printing plate for use in a press run. As is customary in photolithography, each image contained in the layout must have been produced in the form of a photographic negative which can be used in the photocomposing machine and each such negative is provided with reference marks for positioning the negative, the marks generally being four crosses one of which is centered in each of the four boundaries of the negative. For purposes of illustration, the layout in FIGURE 1 is shown comprised of a first image 12 and second image 13 with the usual reference crosses 14 marked thereon. It should be understood however that successive layouts may be composed of various types, configurations, and numbers of images and the invention is fully adaptable to any of the many types of layouts which it may be desired to process.

In order to record the position of the images 12 and 13 in the layout, two guide elements are employed, a first such element 16 being used to record the displacement of the images from a reference point 17 in the vertical direction, and a second such element 18 being used to record the displacement in the horizontal direction. The guide elements 16 and 18 may take a variety of forms but should be inelastic and preferably rigid and are here shown as simple bars of rectangular cross section. In most embodiments of the invention, the bars 16 and 18 are made at least equal in length to the vertical and horizontal dimensions of the board 11 respectively, although variants of the invention are possible in which the bars have other than a linear configuration and in which the bars are of considerably less length than the actual boundary lengths of the layout.

The first guide bar 16 is disposed adjacent a side boundary of the board 11, in parallel relationship to the boundary and in the plane of the board, the second guide bar 18 being similarly positioned with respect to the base boundary of the board. In order that the exact position of the guide bars 16 and 18 with reference to the board 11 may later be duplicated between the guide bars and the movable beds of a photocomposing machine, means must be provided for insuring that the placement of the bars is at a fixed predetermined position, the particular means shown in FIGURE 1 being reference arrows 19 on the guide bars which arrows can be aligned with the board reference point 17 through the use of such means as a T-square 21.

With the guide bars 16 and 18 properly positioned, the points on the guide bars corresponding to the positions of the images 12 and 13 are marked on the bars. To determine the proper points, T-square 21 is moved into coincidence with the central reference crosses 14 of each image in turn, the intersections of the T-square edge with the bars thus defining the desired points thereon. In the use of the guide bars, without further features of the invention, the points may be marked by scribing lines on the guide bars, however such marking is preferably made by positioning movable stops 22 on the bars inasmuch as the use of such stops allows the operation of the photocomposing machine to be made more automatic as will hereinafter be described. Using the simple form of stops shown in FIGURE 1, one side surface 23 of each stop may be used to define the centerline of the corresponding image.

It will now be observed that where a multiplicity of images is present in the layout, it is necessary to provide some means of identifying which particular pair of stops 22 is indicative of the position of each particular image. While the simplest form of making such identification is by appropriate labeling of the stops 22, it is desirable to provide for automation of the photocomposing machine by establishing an identification which can be sensed by mechanized means. To accomplish this form of stop pair identification, each stop may be made electrically energizable and means may be provided for selectively energizing only a pair of stops at any given time, which energized pair of stops are those indicative of the position of the desired image. In the apparatus of FIGURE 1, each stop 22 is made of electrically conductive material and is supplied with a terminal, preferably a jackplug 24, through which a potential can be applied to the stop. To provide the means for selectively applying potential to particular pairs of stops 22, a multiple position switch 28 is used which switch has a swinger 27 adapted to be connected with a power source. Swith 28 is provided with a number of contacts 29, each of which may be contacted by the swinger 27, equal to the maximum number of images to be included in a layout, only two such terminals being shown in FIGURE 1 for purposes of illustration.

A separate pair of leads 31 connect with each stationary contact 29 of switch 28 and terminate in suitable fittings for plugging any lead in any of the stops 22. Thus when the pair of stops indicative of the position of a particular image have been positioned on the guide bars, the two leads 31 from one of the stationary contacts 29 are connected with the stops, one lead going to each of the pair of stops. Once this connection has been made, setting of the switch to supply potential to the specified stationary contact 29 will energize only the particular pair of stops indicative of the position of a particular image. By making similar connections between other stationary contacts 29 and the pairs of stops representing other images, the switch 28 can be used to identify any particular pair of stops by making an appropriate setting. To facilitate this process, each image is assigned a number, and the various settings of the switch identified by a reference number 32 on the dial thereof. Since in some instances a single stop will indicate the position of more than one image, as where images are disposed in a column, a unidirectional current element, such as crystal rectifiers 30, is connected in series with each lead 31 so that two such leads may be plugged to a single stop without feeding current back to other stops through switch 28.

When the described connection of leads 31 to stops 22 has been made at the layout table, the recording of information necessary to control photocomposing operations is complete and the guide bars 16 and 18 may be detached and transferred from board 11 to the photocomposing machine. In the embodiment of the invention shown in FIGURE 1, the switch 28, which is connected to the guide bars 16 and 18 by the leads 31, is transferred with the bars to preserve the identification of paired stops. It should be understood that variants of the invention are possible in which the switch 28 need not be removed from the layout table with the guide bars, the electrical identity of paired stops being preserved by other means, an example of which will hereinafter be described in detail.

Referring now to FIGURE 2, certain of the principal mechanisms of a photocomposing machine are shown in schematic form together with such of the apparatus of FIGURE 1 as is transferred thereto. The form of photocomposer shown in FIGURE 2 is provided with a flat rectangular bed 34 on the surface of which a sensitized printing plate blank 36 may be fastened, the bed being mounted to be movable in a direction paralleling one boundary thereof. To effect translation of the bed 34, a lead screw 37 is disposed adjacent the boundary of the bed and aligned in the direction of motion of the bed, the lead screw being rotatable by a reversible electrical vertical motor drive 38. An arm 39 projects laterally from the bed 34 and is provided with an internally threaded bore 41 through which the lead screw 37 passes and which the screw engages so that rotation of the screw acts to translate the bed.

To provide motion in a direction perpendicular to that of the bed 34, a negative holder 42 is mounted above the bed, in parallel relationship therewith, and is similarly provided with translating mechanism. The holder 42 is a rectangular frame in which a negative 43 is placed, the frame being provided with a laterally projecting arm 44 having a transverse threaded bore 46 through which a second lead screw 47 passes. The second lead screw 47 is aligned perpendicular to the first lead screw 37 and is rotated by a second reversible electrical drive motor 48. It should be understood that the described arrangement of a photocomposer, in which the plate 36 moves in a first direction and the negative 43 moves in a second perpendicular direction, represents but one of several major types of photocomposing machine. As is well known in the art, other types of photocomposer are available in which the plate is stationary and the negative undergoes motion in each of two perpendicular directions or in which the negative is stationary and the plate translates in two directions, the necessary requirement being only that some means be provided for producing relative motion between the plate and negative in each of two perpendicular directions. The invention is fully applicable to all such classes of photocomposer and an example of the use of the invention with another of the types of photocomposer will hereinafter be given.

Considering now how the guide bars 16 and 18, with associated stops 22, are utilized to control motion of the photocomposer to reproduce the pre-determined layout of images on plate 36, such guide bars must first be positioned with respect to the movable beds of the photocomposer in a manner analogous to the former positioning of the bars with respect to the layout table, i.e. the board 11 of FIGURE 1. As is customary, the photocomposer is provided with some form of reference by which the motion of movable members can be related to a fixed base, such means being indicated in FIGURE 2 by a machine zero point 49 corresponding to reference point 17 on the board 11 of FIGURE 1. The first guide bar 16 is disposed adjacent bed 34, in parallel alignment with first lead screw 37, and is positioned longitudinally so that the reference arrow 19 thereof is in line with the machine zero point 49. Similarly, the second guide bar 18 is disposed adjacent negative holder 42, in parallel with second lead screw 47, and is positioned longitudinally by matching reference arrow 19 with the zero point 49.

To provide a means whereby translation of the bed 34 and negative holder 42 can be temporarily stopped at the proper positions for exposures of negative 43 to plate 36 each of the drive motors 38 and 48 is connected to a motor power supply 51 through a set of normally closed relay contacts, contacts 52 controlling the first drive motor 38 and contacts 53 controlling the second drive motor 48. For purposes of starting and stopping the photocomposer, the connections to each of the drive motors 38 and 48 is made through a master control switch 54. Considering now how the relay contacts 52 and 53 are opened to interrupt motion of the bed 34 and negative holder 42 at appropriate times, a first stop sensing contact 56 is mounted on the end of bed arm 39 in position to sweep along guide bar 16 in synchronism with motion of the bed and to contact the various stops 22 thereon. Similarly, a second stop sensing contact 57 is mounted on the arm 44 of negative holder 42 in position to sweep along the second guide bar 18. A connection from first stop sensing contact 56 passes through a relay coil 58 to ground, the coil 58 being in operative relationship to first relay contacts 52. Similarly, the second stop sensing contact is connected to ground through a second relay coil 59 which coil controls second relay contacts 53. Thus when either of the stop sensing contacts encounters an energized one of the stops 22 on the guide bars 16 and 18, the corresponding relay 58 or 59 is actuated to interrupt operation of the corresponding drive motor 38 or 48. If translation of both movements was commenced at the limit of movement, such translation will be interrupted at a relative position between the negative 43 and plate 36 corresponding to the pre-determined desired position of an image on the plate and an exposure can be made by directing an intense light source through the negative onto the plate in the conventional manner. The drive motors 38 and 48 may then be actuated in a reverse direction to return the moving elements to the limit of translation, after which a new pair of position indicating stops may be energized and the foregoing process repeated to place a further image on the plate 36.

Considering further the process of operating the photocomposer and specifically the means by which selected pairs of the stops 22 are energized to determine at which image position the moving elements will stop, it will be noted that the multiple position switch 28 together with associated connections 31 to the various stops has been transferred to the photocomposer along with the guide bars 16 and 18. It is therefore only necessary to connect swinger 27 of the switch with a source of electrical power 61, preferably a direct current source, through a suitable fitting such as jack plug 62. When such connection has been made, the switch 28 may be manipulated to energize successively the pairs of stops indicative of the position of successive images, the particular image corresponding to any setting being readily determined by the numerals 32 on the face of the switch.

The apparatus as shown in FIGURES 1 and 2, and as described above, is intended to be illustrative of certain of the basic principles of the invention and certain of the elements shown and described can readily be replaced with equivalent structures. Energization of the stops 22, for example, may take the form of energizing a small light bulb carried in a well on the stop in which case, the stop sensing elements 56 and 57 are replaced with phototubes sensitive to light from an energized stop. Other variations in the structure will suggest themselves to those skilled in the art and the invention should not be considered to be limited to the form of apparatus shown. Similarly, the method of practicing the invention is subject to variation in accordance with particular job requirements. Notably it may be found unnecessary to make a prearranged layout on the board 11 in instances where the layout is simple, particularly where the layout consists of a single repeated image regularly arranged in rows and columns as, for example, in printing blocks of stamps. In such an instance it may be found convenient to fix the placement of stops 22 on the guide bars 16 and 18 by simply measuring the required spacings from the reference arrows 19.

It will be observed that the invention as described to this point eliminates any necessity for reading scales and verniers, either at the layout table or at the photocomposer, and eliminates the need to record numerical information. In addition, it has been shown how the operation of the photocomposer can be partially automated in that the operator need not manually control movement of the negative relative to the plate, such movement being automatically interrupted at the precise points where exposures are to be made. It will now be found, as a consequence of the use of the novel guide bars, that a still greater degree of automation in the operation of the photocomposer becomes possible. The customary operations of lowering the negative against the plate, drawing a vacuum between the negative and the plate to insure contact at the time of exposure, controlling the light source to make the exposure, and retracting the negative from the plate to allow further movement, can now all be performed by mechanical means, the operator being required only to mount the guides, negatives, and plates on the machine and thereafter to manipulate electrical switches.

Accordingly there will now be described a complete photocomposing system, including layout table, photocomposer, and position data storage means as transferred therebetween, which system accomplishes the above described automatic operation of the photocomposer, the apparatus being shown and described in detail to illustrate preferred design features and to show additional inventive features through which accuracy and ease of operation is maximized.

Referring now to FIGURE 3, there is shown a layout table upon which images can be prearranged in the relationships which such images are to occupy on a printing plate. The table comprises a flat rectangular bed 63 mounted on a rectangular frame 64 which frame in turn is supported by legs 65. To facilitate use of the table, the bed 63 is pivotally mounted on the frame 64 so that the rearward portion of the bed may be adjustably elevated. Disposed upon the surface of bed 63 is a raised rectangular layout board 66 which may advantageously be formed of translucent material and illuminated from underneath in the manner of the conventional tracing table. The dimensions of the board 66 are substantially less than those of the bed 63 and the board is positioned thereon to leave all four margins of the bed available for mounting additional elements of the apparatus.

To provide a straight-edge aligned parallel to the base of board 66 and movable thereacross in a forward and rearwardly direction, a pair of lateral ways 67 and 68 are disposed on bed 63, one on each side of board 66 and in parallel alignment with the side boundaries thereof. Viewed from the forward edge of the layout table, way 67 is disposed to the right of board 66 and is spaced a distance therefrom to allow for intervening elements which will hereinafter be described, the way 67 being of sufficient length as to extend a distance rearwardly from the board. Way 68 is disposed immediately adjacent the left boundary of board 66 and similarly extends a distance beyond the rear edge of the board. A longitudinal groove 69 extends along the upper surface of each of the ways 67 and 68, the grooves being of dovetail configuration in order to engage dovetail projections 71 on the under side of two runners 72 and 73 which slide along the ways 67 and 68 respectively. In order to insure that the two runners 72 and 73 slide along their respective ways in synchronism, an axle 74 extends between the two runners above the surface of board 66, a pair of gears 76 being mounted on the axle one adjacent each of the runners. A gear rack 77 is disposed longitudinally on each of the ways 67 and 68 on stepped shelves 78 thereon, the shelves and gear racks being beneath the gears and positioned so that the gears engage the racks. The runners 72 and 73 are thus constrained to move in synchronism inasmuch as motion of one is transmitted to the other through the gears 76 and axle 74. To facilitate control of such movement, the end of axle 74 is transpierced completely through runner 72 and a handwheel 79 is operatively connected thereto.

Although the invention eliminates any necessity for numerical measuring devices, provision for such measurement may be a convenience in specific situations such as instances where it is desired to set stops on a bar from a calculation of image positions rather than from an actual layout. Accordingly, the handwheel 79 does not connect directly with axle 74 but drives the axle through a vernier device 81, the mode of construction and use of such devices being well understood in the art. For use in conjunction with vernier 81, a measuring scale 82 is disposed along the top surface of way 67 for reading the displacement of runner 72 from the forward boundary of board 66.

A second axle 83 extends between runners 72 and 73 above the surface of board 66 and forward from axle 74, the end of axle 83 being transpierced through right runner 72 and being equipped with a hand lever 84 with which the axle can be turned. A cylindrical sleeve 86, equal in length to the width of board 66, is secured coaxially on axle 83 and serves to mount a flat straight edge 87 which straight edge is parallel to sleeve 83 and attached thereto by means of a flat transition piece 88. In order that the straight edge 87 may be caused to lie flat against the board 66, by appropriate manipulation of hand lever 84, the straight edge and transition piece are angled with respect to each other. For purposes to be hereinafter discussed, the end of straight edge 87 adjacent way 67 functions as an electrical contact and is therefore formed of conductive material, the contact end 89 of the straight edge 87 being extended a small distance beyond the right boundary of board 66.

To provide for a second straight edge movable across board 66 in a direction perpendicular to the direction of movement of straight edge 87, a second set of elements corresponding to those previously described is utilized. Thus a second pair of ways 91 and 92 are disposed on bed 63, way 91 being spaced forward from the front edge of board 66 and aligned parallel thereto and way 92 being disposed adjacent the rear edge of the board. As in the previous case, the ways 91 and 92 have longitudinal dovetail grooves 93 on the upper surfaces and each have a lower shelf 94 on the side adjacent board 66 upon which shelves are mounted gear racks 96. The ways 91 and 92 terminate flush with the right boundary of board 66 but extend a substantial distance beyond the left boundary thereof. It will be noted that special provision must be made at the intersection of way 67 with way 92 in order that the grooves and gear racks of each be free from obstruction. This is accomplished by forming each of the ways in two pieces, the intersection being formed by a separate block of material 97 having intersecting dovetail grooves 98 which are a continuation of the grooves 93 of the ways. Intersecting slots 99 are cut through the block 97 in order that the gear racks 96 of each of the ways can be made continuous, a grid of gear teeth 101 being disposed in the slots so that no obstruction is presented to a gear traveling along either rack.

A second pair of runners are mounted on the ways 91 and 92, runner 102 being slidable along way 91 by means of a projection 103 engaging the groove 93 thereof, and runner 104 being similarly mounted to slide along way 92. An axle 106 extends between the two runners 102 and 104, one end thereof being transpierced through runner 102 and coupled to a handwheel 107 through a vernier mechanism 108. A pair of gears 109 are secured coaxially on axle 106 in position to engage gear racks 96 whereby the runners 102 and 104 are constrained to move along their respective ways in synchonism. For purposes of measuring positions, a second scale 111 is disposed along the upper surface of way 91. An additional axle 112 extends between the runners 102 and 104, to the right of axle 106, and a straight edge 113 is attached thereto by means of a sleeve 114 and angled connecting member 116. The end of straight edge 113 nearest runner 102 extends a small distance forward from board 66 to form an electrical contact 117.

The elements of the layout table as heretofore described provide a means whereby a layout can readily be made on the surface of board 66 and whereby the position of individual images in the layout, in terms of vertical and horizontal displacements from a fixed reference, can be projected to the boundaries of the board 66 for recording in order that such positions can later be reproduced on a printing plate through the use of a photocomposer. The procedures for making the layout are well known in the art and can be studied by reference to: Publication No. 515, "Photo Composing" by Charles W. Latham, issued by Lithographic Technical Foundation, Inc., 131 E. 39th St., New York 16, N. Y. (1953). The elements of the layout table as heretofore described are susceptible to use in the conventional manner, i.e. conventional practice is to measure the vertical and horizontal displacements of each image 115 in the layout 120 by successively bringing the straight-edge 87 and 113 into register with image reference marks, reading the displacements by means of scales 82 and 111 and verniers 81 and 108, and recording such displacements in numerical form on a job order which is transferred to the photocomposer operator.

Considering now elements of the invention through which certain of the conventional steps are dispensed with, there is shown a pair of removable guide bars, a first or vertical guide bar 118 being disposed between way 67 and the right edge of board 66 of the second or horizontal guide bar 119 being disposed between the forward edge of the board and way 91. Each of the guide bars 118 and 119 is substantially longer than the adjacent boundary of the board 66 and is positioned so that bar 118 extends a distance rearwardly of the board and bar 119 extends a distance to the left of the board. The forward end of bar 118 is supported in a U-shaped bracket 121 on bed 63 and the right end of bar 119 rests in a similar bracket 122. In order that the two bars 118 and 119 be maintained absolutely stationary and in exact parallelism with the adjacent edges of board 66, the brackets 121 and 122 are machined so that the bars fit tightly therein with minimum play. The rearward end of the vertical bar 118 rests on the base plate 123 of a positioning device 124, the right side of the bar being abutted against a bracket 126 which projects upwardly from the base plate. To hold the bar 118 against the bracket 126 and to position the bar longitudinally, a rectracting bolt 127 of rectangular cross-section is slidably disposed within a housing 128 on base plate 123, the bolt and housing being aligned at right angles to the bar and disposed on the opposite side thereof from bracket 126. A compression spring 129 is disposed within the housing 128 to urge bolt 127 in the direction of bar 118 and a knob 131 projects upwardly from the bolt to facilitate retraction thereof when the bar 118 is being installed and removed. To insure exact longitudinal positioning of the bar 118, the right end of bolt 127 is provided with matching lateral bevels to form a point which point enters a matching notch 132, of V-shaped configuration, on the side of the bar.

The left end of horizontal guide bar 119 is supported and positioned by a second positioning device 133 similar in construction to the positioning device 124 as described above and having a rectracting pointed bolt 134 engaging a reference notch 136 in the side of the bar.

The positions of images in the layout are recorded by a plurality of stops 137 which may be slid along each of the bars 118 and 119 to selected positions and clamped thereat. The number of such stops on each of the bars is equal to the maximum number of images which may be expected in a layout, the embodiment of the invention here shown making use of twelve such stops on each bar for purposes of example only.

Referring now to FIGURE 4, the structure of the bars 118 and 119 with attached stops 137 is shown in more detail, the bars being shown removed from the layout table and being shown with completed electrical connections such as are typical of a job set-up. The two bars 118 and 119 are of similar design except for the difference in length hereinbefore described and the reverse placement of components, each of the bars being a mirror image of the other so that each bar will present the same side to the board of the layout table in spite of the different positions with respect thereto. Considering now bar 118 in particular, as representative of the two, it may be seen that such bar is of hollow rectangular cross-section and is somewhat greater in width than in height. A longitudinal slot opening 138 extends along one side of the top surface of the bar 118 to provide access to the interior chamber thereof, the slot being terminated short of each end of the bar and occupying the half of the bar which is outermost when the bar is mounted on the layout table, i.e. the side of the bar opposite reference notch 132.

The second half of top surface of bar 118 is closed by a stop guiding rail 139 through which is cut a narrow longitudinal slot 141. As best shown in FIGURE 5, the edge of rail 139 is doubled back within the bar, underneath and spaced from slot 141, to form a small shallow chamber 142 into which the slot opens. Referring now again to FIGURE 4, the end of bar 118 furthermost from reference notch 132 is filled with a plastic material 143 in which is set the female half of a multiple conductor electrical connector 144, the face of the connector being flush with the end of the bar. Connector 144 has a number of pin sockets 146 equal to the number of stops 137 to be employed with the bar, in this instance twelve, and each such socket connects with one of twelve flexible conductors 147 which conductors terminate in male jack plug terminals 148 and which are disposed within the interior of the bar. To identify particular ones of the conductors 147, each is provided with a numbered tag 150 which tags are adjacent the plug terminals 148. Also disposed within the interior of the bar, against the side wall thereof, are a series of electrical jumpering connectors 149, each such connector having three female jack plug receptacles 151 all connected to a single flexible lead 152 terminating in a male jack plug connector 153, the function of these elements being hereinafter discussed.

Referring now to FIGURES 5 and 6, each of the stops 137 comprises a rectangular block 154 of electrically insulative material which block is slidingly disposed on the top surface of guide bar rail 139 and which is provided with a rectangular projection 156 on the underside which projection extends down into slot 141. To insure against cocking of the stops on the guide bar, and consequent loss of accuracy, both the sides of the slot 141 and the matching lateral surfaces of projection 156 should be carefully machined to minimum tolerances. Also of importance is the requirement that the width of the stops 137, as measured along the axis of the guide bars, be kept to a minimum as such width normally fixes a minimum spacing of images in the layout. If, however, less than this minimum spacing should be required, specialized substitute stops may be employed as will be described.

Considering now mechanism by which the stops 137 may each be clamped at a selected longitudinal position on the guide bars, an internally threaded bore 157 extends down through block 154 and projection 156 thereof, such bore opening into chamber 142. A thumbscrew 158 is disposed within the bore 157 and is engaged with the threads thereof, such screw being terminated in a flange 159 within chamber 142. A washer 161 is mounted coaxially on the lower portion of thumbscrew 158 immediately above flange 159 so that turning of the thumbscrew will clamp block 154 to rail 139.

Referring now to FIGURE 6 in particular, a thin flat electrical contact 162 is imbedded within the upper portion of block 154, the contact being upright and having a beveled upper edge projecting slightly above the upper surface of the block. In order that the precise position of the contacts 162 as measured along the axis of the bar 118 may be marked off on a template for record purposes, in instances where the bar itself is not to be stored as a record, the contact 162 is offset from the center line of block 154 so that thumbscrew 158 need not interfere with the template. In instances where the separation of images on the plate must be less than the width of the stops, a specialized stop may be employed in which the contact 162 is situated at one side surface of the stop.

To provide for electrical energization of the contact 162, the female portion of a jackplug connector 163 is imbedded within block 154 such connector opening on the side thereof nearest the center of the bar 118 so that the male jack plug connectors 148 of the leads 147, here indicated in phantom, may be connected thereto. A short conductor 164, wholly imbedded within block 154, leads from connector 148 to contact 162.

Referring now again to FIGURE 3, there is shown a layout table electrical component housing 166, the top surface of which constitutes a control panel 167, mounted on a rectangular extension 168 of bed 63 at the forward portion of the right edge thereof. A first and second flexible multi-conductor cable 169 and 171 lead from housing 166 to guide bars 118 and 119 respectively. Each of the cables 169 and 171 terminate in a twelve pin male connector half 172 which plugs into the guide bar female connector halves 144 previously described in connection with FIGURE 5. The male connectors 172 are of the type keyed to the corresponding female connectors so that a given conductor of the cables is always connected to the same lead from the female half of the connector.

Referring now to FIGURE 7, the electrical components and connections of the layout table are shown in schematic form the components within and on the control panel housing being enclosed by dashed line 166. The guide bars 118 and 119, each with three representative stops 137 thereon, are shown in the relative positions the bars occupy on the layout table. Similarly the straight edges 87 and 113, together with terminal contacts 89 and 117 thereon, are shown in position to be moved along the guide bars and to connect with the contacts 162 of the stops. Considering now the means by which a particular stop is electrically identified as being indicative of the position of a specific image in the layout, a multiple position switch 173 is provided, which switch has two levels each with twelve terminals 174 and 174' respectively and two synchronized swingers 176 and 176' which may be successively contacted with each of the terminals. For facilitating the connecting of stops, the various settings of switch 173 are each made identifiable by numerals 177 on the face of the switch. A separate pair of leads 178 and 179 connect with each of the terminals 174 and 174' of the switch 173, the lead 178 from each first level terminal passing through the previously described flexible cable 169 and associated connector 172 to connect with an individual one of the leads 147 of the vertical guide bar 118. Similarly the second lead 179 from each of the second level terminals 174' connects through cable 171 with an individual one of the leads 147 of the horizontal guide bar 119. Assuming a potential to be provided to a particular pair of terminals 174, and 174' at a given setting of the switch, such potential will then be communicated to one of the leads 147 of each guide bar and if the specified lead 147 of each bar is plugged into a particular one of the stops 137 on each bar, then the specified pair of stops may thereafter be re-energized by setting the switch 173 to re-energize the corresponding pair of terminals 174 and 174'. To provide the stop energizing potential to any selected one of the terminals 174, the swingers 176 and 176' of the switch 173 are connected with one secondary terminal of a transformer 181, the primary of the transformer being connected through a power control switch 182 with a standard source of alternating current here indicated by input terminals 183.

Since, at the layout table, the straight edges 89 and 113 are moved to particular levels indicative of the position of an image in the layout and then the pair of stops 137 which are to record the position of that image are slid along their respective guide bars to the levels of the straight edges and clamped at those points, the circuit includes connections whereby the exact coincidence of a stop contact 162 with the straight edge is indicated. To accomplish the foregoing, a separate indicator lamp 184 is connected in series with each of the leads 178 and 179, such lamps being physically positioned in two columns on the control panel, one column being the lamps connected with vertical stops and the other column containing the lamps connected with horizontal stops. To provide for a current through the lamps 184 at such times as the corresponding stop 137 is in exact register with a layout table straight edge 87 or 113, the remaining secondary terminal of power transformer 181 is connected, through a current limiting resistor 186, with the terminal contacts 89 and 117 of the two straight edges. Thus if the switch 173 is at a particular setting and the particular stops 137 which are thereby energized are slid to exact register with corresponding straight edges, the circuits from the transformer 181 through the switch 173 and associated conductors to the stop 137 is closed by the contacts 89 and 117 and the appropriate lamps 184 are thereby lit to indicate the desired positioning of the stops has been achieved.

Considering now the function of the jumper connectors 149, it will be found that in some layouts a single stop 137 may be indicative of the position of more than one image in the layout, such a condition being true where the layout is composed of similar images arranged in a vertical or horizontal column. To permit a single stop 137 to be energized at a plurality of settings of the position selector switch 173, and with reference to just the vertical guide bar for purposes of illustration, the leads 147 on the guide bar corresponding to the various settings of the switch which are to energize the same stop are connected together and jointly connected to the stop. As may be seen, this is conveniently accomplished by plugging the various leads 147 into the successive inputs 151 to the jumper connector and then by connecting the single jumper connector output lead 152 with the stop plug receptacle 163. Inasmuch as a single jumper connector 149 is provided with only three inputs, whereas some layouts may call for a large proportion of the images to be represented by a single stop on one of the guide bars, it should be observed that the output lead 152 of a particular jumper connector 149 may be plugged into an input 151 of a subsequent jumper connector thereby effectively forming a large jumper connector with five inputs. Subsequent ones of the jumper connectors 149 may be similarly connected in tandem so that as many as all twelve of the leads 147 may be connected to a single stop 137 through the output lead 152 of the final jumper connector in the series.

Considering now the general sequence of operations at the layout table, with reference to FIGURES 3, 4, and 7 collectively, and considering the guide bars 118 and 119 to have been positioned thereon as previously described and considering the layout of images to have been made on board 66 in the conventional manner, a first operation is to connect cables 169 and 171 with guide bars 118 and 119 respectively and to close the power switch 182. Horizontal straight edge 87 is then traversed into coincidence with the reference mark of the first image in the layout by manipulation of hand wheel 79 and position selector switch 173 is set to station one. The first lead 147 at the guide bar 118 is plugged into one of the stops 137 which is to represent the position of the first image and the stop is slid along the guide bar until the contact 162 of the stop is in exact coincidence with the straight edge which condition is indicated by lighting of the corresponding indicator lamp 184. The stop 137 is clamped at the proper position by means of the thumbscrew 158 and a similar sequence of operations is carried out to position a stop on the horizontal guide bar 119 indicative of the lateral displacement of the first image in the layout. The straight edges 87 and 113 may then be traversed into coincidence with the second image in the layout, the position selector switch 173 set at station two, and the above described operations repeated to record the position of the second image.

When the positions of all images in the layout have been fixed by placement of stops on the two guide bars, together with the described electrical connections to define which stops are paired and which pairs are indicative of each image, cables 169 and 171 are disconnected from the guide bars 118 and 119, positioning devices 124 and 133 are retracted and the guide bars are removed from the layout table and sent to the photocomposer operator. The guide bars 118 and 119 now contain within themselves all positional information needed to control operation of the photocomposer and contain such information in a form detectable by electromechanical mechanisms so that automation of photocomposer operation can be achieved.

Referring now to FIGURE 8 there is shown a photocomposer adapted to receive the guide bars 118 and 119 and to operate in a highly automatic manner from the control information stored in the guide bars. It will be understood that the form of photocomposer shown is but one example of such machines; however, the adaptation of other forms of photocomposer to make use of the invention will be apparent to those skilled in the art by consideration of this particular example.

The photocomposing machine comprises a flat rectangular base table 187, supported by four legs 188, each side margin of the table having an upwardly extending rectangular support member 189. To provide a traversable bed movable in a first direction, a pair of horizontal cylindrical rods 191 extend between the supports 189 above the top surface of table 187 one such rod being at the rear portion of the table and the other being close to, but not immediately at, the front. A first carriage 192 is adapted to travel along the rods 191, the carriage comprising a flat rectangular bed 193 having bearing blocks 194 and 195 extending along the front and rear margins respectively, the rods being passed through longitudinal bores 196 in the bearing blocks. To control motion of the first, or horizontal carriage 192, a reversible electrical motor 197 is secured to the underside of bed 193, the motor being of the class having an axial passage through the rotor which passage is threaded for engagement with a lead screw. A stationary lead screw 198 extends between the bed side supports 189, the screw passing through the motor 197 and being engaged therewith whereby operation of the motor will draw the carriage 192 along the rods 191.

A second, or vertical motion carriage 199 is mounted on the first carriage 192 and adapted to move at right angles thereto, it being understood that the terms horizontal and vertical as herein used with reference to the carriages and associated drive motors refer to directions with respect to the top, bottom, and sides of a printing plate, rather than to the physical orientation of such parts in space, such terminology being commonly employed in the art even though the plate may in fact be disposed horizontally as is done in the present instance. The second carriage 199 comprises a second flat rectangular bed 201 considerably smaller than the first carriage bed 193, the bed 201 having two spaced apart parallel bearing blocks 202 on the underside which blocks extend from the front of the bed to the rear and which have longitudinal passages 203. To mount the bed 201, a pair of spaced apart rods 204 extend between upright supports 206 on the bearing blocks 194 and 195 of the first carriage 192, the rods being passed through the passages 203 of the bearing blocks 202. The second carriage 199 may thus move forwardly and rearwardly on the photocomposer at right angles to the motion of the first carriage 192. To effect such motion of the second carriage 199, a vertical motion drive motor 207 is mounted on the underside of bed 201 such motor being similar to the horizontal drive motor 197 and engaging a stationary lead screw 208 which screw extends betwen central upright supports 209 on the first carriage bearing blocks 194 and 195.

An actinically sensitized printing plate 211 may be mounted on the top surface of bed 201 and the above described mechanisms provide a means whereby the plate may be translated to any desired position with respect to a stationary negative holder. Considering now the negative holder and mounting means therefor, the invention makes use of the customary rectangular frame negative holder 212, the detailed structure of the holder, as well as the means for mounting and positioning the negative therein being well understood within the art, and for an example of a suitable negative holder structure, reference may be made to U.S. Patent 2,825,142 issued to the present inventor March 4, 1958, for Image Registering Apparatus for Photocomposing Machines.

The negative holder 212 is mounted above bed 201, and positioned centrally with respect to the photocomposer base table 187, by a pair of horizontal brace members 214 which extend rearwardly from the holder to a holder support block 216. To forestall any possible vibration or flexing of the braces 214, additional bracing is provided by uprights 217 on the support block 216 the top of which uprights are connected to the braces 214, at points adjacent the negative holder 212, by struts 218. To permit the negative to be raised when the plate 211 is to be moved, a chase drive motor 219, similar in type to the drive motors 197 and 207, is mounted on the base table 187 immediately beneath the support block 216 and in a vertical alignment. A vertical lead screw 221, secured to the underside of block 216, is engaged by the motor 219 so that operation of the motor will raise or lower the block and thus the negative holder 212. To guide motion of the negative holder 212, a pair of vertical rods 222 extend down through bores 223 in vertical bearing blocks 224 which blocks are secured to the base table 187.

Further components of the photocomposer are a light source 226 of the carbon arc type which is mounted above the negative holder 212 to direct light through the negative and onto plate 211 for purposes of making an exposure, the source being enclosed by a hood 227 which directs light towards the negative and which prevents the escape of light to other portions of the plate which are not to be exposed. Still a further component of such machines is a vacuum pump 228, here shown secured to base table 187 adjacent the negative holder support structure and driven by an electrical motor 229. A conduit 231 connects the inlet 232 of the pump 228 with the underside of negative holder 212 the function of the vacuum system, as is conventional in the art, being to evacuate the space between the negative and plate 211 at such times as an exposure is being made in order to insure close contact.

Considering now the receiver means for mounting the guide bars on the photocomposer to accomplish automatic control thereof, there is shown a U-shaped bracket 233 disposed on the upper surface of first carriage bed 193 at the right forward portion thereof, such bracket being shaped to support the forward end of vertical guide bar 118 with the guide bar extending rearwardly on the bed. The opposite end of the guide bar 118 is supported and positioned longitudinally by a positioning device 234 identical in all respects with the positioning device 41 previously described in conjunction with the apparatus of FIGURE 3. The horizontal guide bar 119 is similarly mounted on the forward portion of the upper surface of base table 187, the bar being aligned parallel with the direction of motion of first carriage 192 and being supported and positioned by a bracket 236 and positioning device 237 each identical to the elements 233 and 241 respectively.

Considering now the mechanical structure of certain of the electrical components of the invention, the associated electrical circuitry being hereinafter described, there is shown a stop sensing probe housing 238 secured to the underside of second carriage bed 201 at the center of the right edge thereof. A pair of electrodes project downwardly from housing 238 in position to sweep along the stops 137 on the guide bar 118 and to make contact with the contacts 162 thereof. The more forward one of such electrodes, electrode 239, is for purposes of slowing carriage motion as an energized stop is approached and the rearward electrode 241 is adapted to stop carriage motion the moment contact with an energized stop is made. A similar stop sensing probe housing 242 is secured to the forward edge of first carriage bed 193, such housing carrying a slow electrode 243 and subsequent stop electrode 244, each positioned to sweep along the stops on guide bar 119 in the manner previously described.

To provide a means for instantaneously stopping carriage motion at a specified time, to forestall the effects of inertia in the drive systems, and to provide a means for preventing inadvertent carriage movement, two solenoid operated brakes are utilized, a first such brake 246 being positioned on first carriage bed 193 adjacent front bearing block 194 thereof and the second brake 247 being secured to the underside of second carriage bed 201 adjacent the right bearing block 202 thereof. Referring now to FIGURE 9 for the detailed structure of brake 246, to which brake 247 is identical, it may be seen that a quadrant shaped sector of bearing block 194 is cut away to expose a quarter sector of a portion of the carriage supporting rod 191. An arcuate section of brake lining material 248 matching the exposed portion of the rod 191 is secured in a matching concavity in the lower forward edge of a brake shoe block 249 which block is disposed within a rectangular housing 251 and adapted to slide in a forward and rearward direction therein. To urge block 249 forwardly so that lining 248 bears against rod 191 and prevents motion of the carriage bed 193, a compression spring 252 is disposed within the housing 251, one end of the spring bearing against the block and the other end bearing against the rear interior wall 253 of the housing. To release the brake at such times as carriage motion is to be effected, an iron rod 254 projects rearwardly from block 249 through an opening 256 in the wall 253 into the axial passage of a solenoid coil 257. Thus upon energization of the solenoid 257, the rod 254 is drawn rearwardly effecting the desired retraction of brake lining 248 from the rod 191. It will be found that an advantageous aspect of the foregoing brake structure is that it is automatically applied in the event of a general power failure.

Referring now again to FIGURE 8, a housing 258 is disposed on the right forward corner of base table 187, such housing having a sloping upper surface 259 serving as a control panel. Housing 258 contains various circuit components, to be hereafter described and is provided with two multi-conductor flexible cables 261 and 262 each of which terminates in a twelve pin male connector 263 and 264 respectively and which may be plugged to the terminal connectors of the guide bars 118 and 119 respectively.

Referring now to FIGURE 10, there is shown the electrical circuitry through which information stored in the guide bars 118 and 119 is detected and utilized to control operation of the photocomposer components described above, certain further electrical components of the invention being shown schematically.

The sequence in which images are burned on the plate is determined by appropriate settings of a position selector switch 266, which switch has two decks each having twelve numbered terminals 267 and 267' each of which paired terminals 267 and 267' may be contacted by a pair of synchronized swingers 268 and 268', the switch being similar to that previously utilized at the layout table. A pair of conductors connect each pair of terminals 267 and 267' with the guide bars, a first one 269 of each pair being passed through the flexible cable 261 to an individual pin of the terminal male plug connector 263 thereof, the second conductor 271 of each pair passing through flexible cable 262 to a pin of the associated terminal connector 264. The male connectors 263 and 264 are keyed to connect with the terminal female connectors 144 of the guide bars 118 and 119 respectively to establish the identical connections between the numbered terminals 267 and 267' of switch 266 and stops 137 of the guide bars as was previously set up on the layout table with respect to the position selector switch thereof. To avoid undue complication, only three sets of conductors 269 and 271, stops 137, and associated elements are shown in FIGURE 10 it being understood that similar elements are associated with each of the remaining switch terminals 267.

To apply an electrical potential to the swingers 268 and 268' of switch 266, the swingers are connected to one secondary terminal of a power transformer 272, the primary winding of the transformer being connected with a standard source of alternating current, here indicated by terminals 273, through a power on-off switch 274. Inasmuch as certain of the elements connected with the switch terminals 267 and 267' are on exposed portions of the photocomposer, the transformer 272 is of the step down type, the secondary voltage being of the order of six volts for safety reasons.

The foregoing circuitry provides a means whereby the pair of stops 137 indicative of the position of any selected image in the layout may be energized by an appropriate setting of the position selector switch 266. When a particular image is to be burned on the plate, the stops 137 representative of that image having been energized as described, a series of functions must be performed by the photocomposer which functions, in sequence, are as follows: the horizontal and vertical carriage drive motors 197 and 207 must be actuated to traverse the moving beds of the photocomposer to bring the negative towards the proper position with respect to the plate; the stop sensing probes, comprising the elements contained within dashed boxes 238 and 242 in FIGURE 10, must be caused to slow each carriage as the proper position is approached and to stop each carriage when the precise position has been reached; the chase drive motor 219 must be actuated to lower the negative against the plate; the vacuum pump drive motor 229 must be actuated to evacuate the region between the negative and the plate, the light source 226 must then be energized to make the exposure, the vacuum motor must then be de-activated and the chase drive motor caused to lift the negative from the plate, and the carriage drive motors must then be actuated in a reverse direction to return the carriages to the starting positions whereby a second pair of stops may be energized and the above sequence of operations repeated.

Considering now the means by which each of the five steps are initiated in sequence and controlled, a function control switch 276 is provided such switch having five levels identified as A to E inclusive and each of which levels has five positions, all levels being constrained to switch between positions in synchronism. Each level of switch 276, with the exception of level A, has a swinger 277 selectively connectable with five terminals identified by numerals 1 to 5 in sequence, which swingers are each connected to the same side of the secondary winding of a second power transformer 278, the primary winding of the transformer being connected in parallel with the primary winding of first transformer 272. The swinger 279 of level A is connected to swinger 268 of position selector switch 266 through the secondary winding of the first transformer 272. Each level of switch 276 also includes an off position identified by the numeral 0.

Considering now the circuitry relating to the stop sensing probes, and particularly the elements contained within the vertical motion stop sensing probe housing 238, the slow electrode 239 is connected through a slow relay coil 281 with terminals A1 and A2 of the function control switch 276, the relay coil thus being energized at such times as the switch is at the indicated positions and the electrode makes contact with an energized stop 137 on the guide bar 118. Relay coil 281 drives a set of normally open relay contacts 282 and a set of normally closed contacts 283, the normally open contacts being connected between the electrode 239 and the secondary of first transformer 272 at the terminal thereof which is connected with switch 266. The effect of the normally open contacts 282 is thus to continue energization of relay coil 281 after contact between electrode 239 and the energized stop 137 has been broken by continued travel of the electrode. The normally closed relay contacts 283 connect, through an additional set of normally closed relay contacts 284, the terminal B1 of switch 276 with the forward drive terminal of vertical carriage drive motor 207. The motor 207, together with the other reversible motors utilized in the invention, are shown with three power terminals, a first terminal 286 being a common ground and the remaining two terminals 287 and 288 being forward and reverse drives respectively. The control components of the motors needed to accomplish reversible drive in an A.C. system not being shown inasmuch as the same are well understood within the art. The effect of the normally closed relay contacts 283 is thus to supply power to the vertical carriage drive motor 207 to effect a forward motion of the corresponding carriage. It will be observed, however, that when electrode 239 contacts an energized stop 137, the relay contacts 283 are opened. To continue the supply of current to motor 207 at a reduced level, thereby slowing motion of the carriage, a variable resistor 289 is connected in parallel with the relay contacts 283 so that opening of the contacts adds additional resistance to the motor drive circuit.

The stop electrode 241 which follows the slow electrode 239 along the guide bar 118 connects through a second relay coil 291 with terminals A1 and A2 of function control switch 276, the coil thereby being energized when the electrode 241 contacts an energized stop 137. Coil 291 drives the previously described normally closed relay contacts 284 and also an additional set of normally open relay contacts 292. In view of the previously described connections to normally closed contacts 284, contact of electrode 241 with an energized stop 137 acts to completely interrupt the supply of power to vertical drive motor 207 thereby stopping the corresponding carriage motion. The normally open relay contacts 292, associated with the second coil 291, connect the electrode 241 with the secondary winding of first transformer 272 at side thereof which is connected to the position selector switch 266, the effect of such contacts thus being to continue energization of the second relay coil as long as function switch 276 remains at positions one and two.

The foregoing elements of the stop sensing unit 238 thus sequentially slow and then stop movement of the vertical carriage on the photocomposer at a position determined by an energized stop on the guide bar 118. Considering now additional elements associated with the above described components, there is shown a limit switch 293 connected in series with the lead from stop sensing unit 238 to the vertical drive motor 207, such switch interrupting drive current to the motor when the vertical carriage reaches either limit of its motion. To release the brake 247 on the vertical carriage, and conversely to apply the brake when operation of the motor is stopped, the third terminal 286 of the motor connects with the secondary of power transformer 278 through the controlling solenoid 257 of the brake. In order to give the operator a visual indication when the stop sensing probes contact an energized stop, one of twelve indicator lamps 294 is connected in series with each lead 269 of position selector switch 266, the lamps being disposed in a column on the control panel which panel is here indicated by dashed box 259. In view of the described connections, the lamp indicative of the particular stop on bar 118 which is energized will flash as the slow electrode 239 contacts the stop and will then subsequently relight and remain lit when the motion of the vertical carriage has been ended by the stop. Inasmuch as the foregoing operations relating to positioning of the negative with respect to the plate are initiated and carried out by setting function control switch at position 1 thereof, such position may be designated the forward to print setting.

The elements described above in connection with the vertical drive system are duplicated to effect and control motion of the horizontal carriage. Thus, within the sensing probe housing 242, the slow contact 243 connects through a first relay coil 281' with terminals A1 and A2 of the function control switch 276, the stop electrode 244 being connected to the same terminals through a second relay coil 291'. First coil 281' drives a set of normally open relay contacts 282' which connect the electrode 243 with the secondary terminal of transformer 272 and the second coil 291' drives a set of normally open contacts 292' which connect the stop electrode 244 with the same point. First coil 281' also drives a set of normally closed relay contacts 283' which connects terminal B1 of switch 276 with the forward drive terminal 287 of horizontal carriage drive motor 197 through a second set of normally closed relay contacts 284' which latter contacts are driven by second relay coil 291'. As in the previous instance, a variable resistor 289' is connected in parallel with the relay contacts 283'. A limit switch 293', is connected in series with the lead between the horizontal drive motor 197 and the stop sensing unit 242, the limit switch being adapted to interrupt the drive current to the motor when the horizontal carriage reaches the furtherest limit of travel. To provide a visual indication of operations, one of twelve indicator lamps 294' is connected in series with each lead 271 from the terminals of position selector switch 266, the lamps 294' being disposed on control panel 259 in positions adjacent the corresponding vertical indicator lamps 294. Again as in the previous instance, the third terminal 286 of the horizontal drive motor 197 connects with the secondary of transformer 278 through the control solenoid 257 of the horizontal motion brake 246. The function and mode of operation of the above described elements of the horizontal drive system are similar to that described in connection with the vertical drive. To prevent inadvertent operation of either drive system at such times as the negative holder may be lowered against the plate, a limit switch 296 is series connected in the lead 297 from the third terminals of the two drive motors to the transformer 278, such switch being adapted to remain closed only at such times as the negative holder is at the uppermost limit of travel.

Considering now elements which are actuated as the function control switch 276 is moved to the second position, at which position the negative is lowered to the plate, the downward drive terminal 298 of chase drive motor 219 is connected to terminals C2 and C3 of the function switch 276 through a lower limit switch 299 which acts to interrupt the circuit when the negative has been lowered against the plate. To complete the chase motor circuit, the third terminal 301 of the motor connects with the lead 297 to the second transformer 278 on the transformer side of limit switch 296. To produce the required vacuum as the negative reaches the plate, one terminal 300 of vacuum drive motor 229 is connected with terminals E2 and E3 of switch 276, the other terminal 305 being connected with second transformer lead 297.

Elements actuated by movement of the function control switch 276 to the third, or exposing, position include light source 226 which is connected across the secondary winding of transformer 278 through a control switch 302.

To control the switch 302 to make an exposure of a pre-determined time period, a timer motor 303 is utilized, the motor having a first drive current terminal 304 connected to the power transformer lead 297 and a second drive terminal 306 connected to terminal D3 of function control switch 276, the motor thus being actuated when the switch is turned to the third position. Timer motor 303 turns a cam 307 having a cam follower 308 connected to close the light source control switch 302. The duration of the exposure is thus set by the configuration of the cam 307 and is fixed at a value commensurate with the intensity of the source 302 and exposure characteristics of the plate material used. To give a visual indication when the exposure is being made, an indicator lamp 309 is connected in parallel with the light source 226, the lamp being mounted on the control panel 259. It will be apparent to those skilled in the art that a variety of other means for controlling the time of exposure may be substituted for the described structure. As a very precise control, for example, the timer motor may be dispensed with and a light integrating device may be adapted to actuate the switch 302.

Considering now mechanisms actuated by movement of the function control switch to the fourth position thereof, the upward drive terminal 311 of chase drive motor 219 is connected to terminal C4 of the function switch through a limit switch 312 which limit switch opens the specified circuit as the negative holder reaches its upward limit of travel.

The final or fifth position of the function control switch 276 reactuates the carriage drives in a reverse direction to return the carriages to the starting positions whereby a second pair of stops 137 may be energized and the described sequence of operations repeated. To effect return of the carriages, the reverse drive terminal 288 of horizontal drive motor 197 is connected to terminal B5 of function switch 276 through a limit switch 313 which switch acts to open the drive circuit when the horizontal carriage reaches the limit of translation. Similarly, the reverse drive terminal 288 of the vertical drive motor 207 is connected to terminal B5 through a second limit switch 314 which switch opens when the vertical carriage is returned to the starting point.

Considering now the general sequence of operations at the photocomposer, with reference to FIGURE 9, it will be assumed that the guide bars 118 and 119 have been received from the layout table area and installed on the photocomposer in the manner previously described, and it will also be assumed that negatives and plates have been mounted on the machine in the conventional manner. By virtue of elements of the invention hereinbefore described, operation of the photocomposer then requires no more than the manipulation of switches at the control panel 259. Power switch 274 is turned on to ready the machine for operation, after which position selector switch 266 is turned to the setting corresponding to the first image to be put onto the plate. The function control switch 276 is then turned sequentially through the five settings thereof, the necessary dwell time at each setting being determinable from the various indicator lights and from visual observation. After the passage of the function control switch through each of its five settings, the first image will have been burned upon the plate and the carriages will have returned to their starting points. The operator then adjusts the position selector switch 266 to the second position of the switch and repeats the sequential setting of function control switch 276. This process is carried out until all images have been burned upon the plate after which the plate is removed and a successive one put into place. In addition to the precision brought about by the use of electromechanical controls, the tedious and error-provoking operation of verniers and measuring scales, together with the necessity of working from numerical data, has been eliminated and a much faster production rate is achieved.

It will now be apparent that the operation of the photocomposer can easily be reduced to the manipulation of a single two way switch if this mode of operation should be desired. A motor drive means can be made to turn the position selector switch 266 through each of the twelve settings thereof, the drive means also being adapted to turn the function control switch 276 through each of its five positions during the time the first switch is at each of its settings. This mode of operation will not, however, be particularly advantageous where different images must be put on the same plate since the process must be stopped between each setting of position selector switch 266 to allow for the changing of negatives.

While the invention has been disclosed with respect to certain specific structures, it will be apparent to those skilled in the art that numerous variations and modifications may be made within the spirit and scope of the invention and thus it is not intended to limit the invention except as defined in the following claims.

What is claimed is:

1. In apparatus for the preparation of printing plates, the combination comprising a layout table having a surface on which a proposed arrangement of images can be set up and having a pair of straight edges one movable across said surface in a first direction and the second movable across said surface in a perpendicular direction, a first guide bar disposable on said table in perpendicular relationship to a first of said straight edges thereon, a plurality of stops securable at selected positions along the length of said first guide bar which positions are indicative of the placement of images in said proposed arrangement thereof as determined through the use of said straight edge, a second guide bar disposable on said table in perpendicular relationship to the second of said straight edges thereon, a second plurality of stops securable at selected positions along the length of said second guide bar which positions are indicative of the placement of images in said proposed arrangement thereof as determined through the use of said second straight edge, a photocomposing machine having a first bed and a second bed and having a first motor driven means for effecting relative travel between said beds in a first of two perpendicular directions and having a second motor driven means for effecting relative travel between said beds in the second of said perpendicular directions, a first receiver on said photocomposing machine for mounting said first guide bar thereon in parallel alignment with a first of said perpendicular directions, a second receiver on said photocomposing machine for mounting said second guide bar thereon in parallel alignment with the second of said perpendicular directions, a first stop sensing probe adapted to travel along said first guide bar in synchronism with relative travel between said beds in said first of said perpendicular directions, a second stop sensing probe adapted to travel along said second guide bar in synchronism with relative travel between said beds in the second of said perpendicular directions, means interrupting operation of said first motor driven mechanism as said first stop sensing probe contacts a selected one of said stops on said first guide bar, and means interrupting operation of said second motor driven mechanism as said second stop sensing probe contacts a selected one of said stops on said second guide bar whereby a photographic negative carried by one of said beds can be exposed to a sensitized printing plate carried by the other of said beds thereby locating an image on said plate in accordance with said proposed arrangement thereof.

2. In apparatus for use in the preparation of printing plates substantially as described in claim 1, the further combination comprising a third stop sensing probe preceding said first probe in traveling along said first guide bar and adapted to slow said first motor driven mechanism upon contact with said selected one of said stops on said first guide bar, a first brake stopping relative travel between said beds in said first direction upon the contact of said first probe with said selected stop on said first guide bar, a fourth stop sensing probe preceding said second probe in travel along said second guide bar and adapted to slow said second motor driven mechanism upon contact with said selected one of said stops on said second guide bar, and a second brake stopping relative travel between said beds in said second direction upon the contact of said second probe with said selected stop on said second guide bar whereby the effects of inertia in travel of said beds are eliminated and extreme accuracy in the placement of images on said plate results.

3. Apparatus for use in the preparation of printing plates substantially as described in claim 1 wherein said first and second stop sensing probes are sensitive to an electrical voltage on said stops and comprising, in combination with the elements previously described, a multiple position switch having a movable contact selectively connectable with a plurality of terminals, a voltage source connected with said movable contact of said switch, a plurality of conductors for connecting selected groups of said stops on said first and second guide bars with selected ones of said switch terminals, each group of said stops connected to said voltage source at a particular setting of said switch comprising a pair of stops one of which is on each of said guide bars and which pair of stops is indicative of the position of a particular one of said images in said arrangement thereof, whereby said stop sensing probes are sensitive to the particular pair of stops indicative of the placement of a particular image in said arrangement the selection of which image is dependent upon the setting of said switch.

4. Apparatus for use in the preparation of printing plates substantially as described in claim 3 and including the further combination of means for making the operation of said photocomposing machine substantially automatic, said means comprising a light source disposed adjacent said negative and adapted to project light through said negative to said plate to produce a latent image thereon, a timer mechanism limiting operation of said light source to a desired exposure time, and a second multiple position switch having a first position at which said motor driven mechanisms for effecting said relative travel between said beds is actuated whereby said stop sensing probes seek out the particular pair of said stops indicative of the placement of an image on said plate which particular image is determined by the setting of said first multiple position switch, said second multiple position switch having a second position at which said light source is actuated for a period of time determined by said timer and having a third position at which said motor driven mechanisms are actuated in a reverse direction to return said beds to an initial position on said photocomposing machine whereby said first multiple position switch can be set to a further position thereof to effect the placement of an additional image on said plate.

5. Apparatus for the preparation of printing plates comprising, in combination, a photocomposer having mechanism for mounting a sensitized printing plate and for mounting a photographic negative holder and for accomplishing relative movement therebetween, an inelastic guide bar, a plurality of stops securable at selected positions along the length of said guide bar which positions are representative of a desired positioning of images on said printing plate, each said stop having an electrically conductive element, means for mounting said guide bar on said photocomposer, a stop sensing element carried by said photocomposer and traveling along said guide bar concurrent with said relative movement between said plate and said holder, said stop sensing element having means for detecting the electrical energization of any of said stops and for effecting an interruption of said movement upon reaching an electrically energized one of said stops, a multiple position electrical switch having a movable element selectively connectable with any of a plurality of terminals, a voltage source connected to said movable element of said switch, and a plurality of conductors for connecting selected ones of said terminals of said switch with selected ones of said stops whereby an appropriate setting of said switch electrically energizes any selected one of said stops, thereby causing movement between said plate and said holder to be interrupted at a relative position therebetween at which an image is to be placed on said plate.

6. In combination with a photocomposer of the class having means for mounting a printing plate and means for mounting a photographic negative holder together with a first and a second motor driven mechanism for effecting relative translation between said plate and said holder in first and second perpendicular directions, a system for controlling the placement of images on said plate comprising a pair of inelastic guide bars, a first plurality of stops securable at selected positions along the length of a first of said guide bars which positions are indicative of a desired positioning of images on said plate in the first of said perpendicular directions, each said stop including an electrically conductive element, a second plurality of stops securable at selected positions along the length of said second of said guide bars which positions indicate a desired positioning of images on said plate along said second direction, each of said second plurality of stops being provided with an electrically conductive element, a first stop detecting element mounted to pass along the length of said first guide bar in synchronism with said translation of said plate relative to said holder in the first of said directions, said first stop detecting element having means sensitive to electrical energization of any of said stops on said first guide bar and adapted to interrupt operation of said first motor driven mechanism upon sensing of an energized one of said stops, a second stop detecting element mounted to pass along the length of said second guide bar in synchronism with said translation of said plate relative to said holder in the second of said directions, said second stop detecting element having means sensitive to electrical energization of any of said stops on said second guide bar and adapted to interrupt operation of said second motor driven mechanism upon sensing of an energized one of said stops, a voltage source, a multiple position switch having a plurality of settings in which said voltage source is connected with selected ones of a plurality of terminals, and a plurality of conductors for connecting selected terminals of said switch with at least one pair of said stops on said guide bars, one member of each said pair of stops being on said first guide bar and one member of said each said pair of stops being on said second guide bar, each said pair of stops being indicative of the desired positioning of a particular image on said plate whereby setting of said switch to connect said voltage source with a particular pair of said stops will cause translation of said plate relative to said negative holder to be interrupted at the proper position for placement of an image on said plate at said desired positioning thereon.

7. Apparatus as described in claim 6 wherein said electrically conductive element in each of said first and second plurality of stops projects at the surface of said stops and wherein said first and second stop detecting elements comprise electrical contacts positioned to intercept said electrically conductive elements and to close an electrical circuit for interrupting operation of said motor driven mechanisms for translating said plate relative to said holder.

8. Apparatus as described in claim 6 and comprising the further combination of a first and second multichannel electrical connector of the class having keyed separable male and female portions, one of said separable portions of each said connector being permanently attached to said photocomposer and the other of said separable portions of said first and second connectors being permanently attached to said first and second guide bars respectively, said plurality of conductors for connecting terminals of said switch with said stops on said guide bars being connected with said stops through said multi-channel connectors.

9. Apparatus as described in claim 6 and comprising the further combination of a plurality of additional conductors for connecting a plurality of said terminals of said switch with a single selected one of said first and second plurality of stops whereby said one of said stops is caused to provide positional data for the placement of a plurality of images on said plate in instances where said plurality of images are to have a common displacement from one boundary of said plate.

10. Apparatus as described in claim 6 wherein said photocomposer is of the class having chase driving mechanism for moving said negative holder against said plate and for withdrawing said holder from said plate and vacuum pumping means for evacuating the region between said holder and said plate at such times as said negative holder is against said plate and comprising the further combination of a second multiple position switch having a first setting in which said first and second motor driven mechanisms are actuated and having an additional setting at which said chase driving mechanism is actuated to move said negative holder towards said plate and said vacuum pumping means is actuated to evacuate the region between said negative holder and said plate, and having an additional setting at which said chase driving mechanism is actuated to retract said negative holder from said plate and having still an additional position at which said first and second motor driven mechanisms are reactuated whereby the operation of said photocomposing machine is made substantially automatic.

11. Apparatus as described in claim 6 and comprising the further combination of a control panel mounting said first and second multiple position switches and a plurality of indicator lights mounted on said control panel, at least one of said indicator lights being electrically connected with each individual one of said plurality of terminals of said first multiple position switch whereby control of said photocomposer is facilitated and a visual indication is given as to which of said stops are electrically energized at any given setting of said switches.

12. An image placement control system for use with a photocomposing machine which machine is of the class mounting a sensitized printing plate and a photographic negative holder and having a first drive motor for translating said plate relative to said negative holder in a first direction and having a second drive motor for translating said plate relative to said negative holder in a second direction which second direction is perpendicular to said first direction, said image placement control system comprising a first guide bar at least equal in length to one boundary of said plate, a plurality of electrically energizable stops securable to said first guide bar at points along the length thereof corresponding to a desired placement of images on said plate as measured along said first direction, a second guide bar at least equal in length to a second boundary of said plate which second boundary is perpendicular to said first boundary thereof, a second plurality of electrically energizable stops securable to said second guide bar at points along the length thereof corresponding to a desired placement of images on said plate as measured along said second direction, a first receiver on said photocomposing machine for mounting said first guide bar thereon in parallel alignment with said first direction thereon, a second receiver on said photocomposing machine for mounting said second guide bar thereon in parallel alignment with said second direction thereon, an electrical power supply, a multiple position switch having a plurality of settings for connecting said power supply with any of a plurality of terminals, a plurality of conductors for connecting selected terminals of said switch with selected pairs of said electrically energizable stops, one of each said pair of stops being on said first guide bar and one being on said second guide bar and each said pair being representative of the desired position of a particular image on said plate, a first stop sensing probe carried by said photocomposing machine in position to pass along said first guide bar concurrent with motion in said first direction and having provision for slowing said first drive motor upon reaching an energized one of said stops, a second stop sensing probe positioned to follow said first probe along said first guide bar and having provision for deactivating said first drive motor upon reaching an energized one of said stops, a third stop sensing probe carried by said photocomposing machine in position to pass along said second guide bar concurrent with motion in said second direction and having provision for slowing said second drive motor upon reaching an energized one of said stops, and a fourth stop sensing probe positioned to follow said third probe along said second guide bar and having provision for deactivating said second drive motor upon reaching an energized one of said stops whereby said relative motion is interrupted at correct positions for the exposure of a negative carried in said holder to said plate.

13. In an image placement control system for use with a photocomposing machine substantially as described in claim 12, the further combination of a first electrically actuated brake mechanism for preventing motion of said plate relative to said negative holder in said first direction, said first brake mechanism being actuated by contact of said second stop sensing probe with an energized one of said stops on said first guide bar, and a second electrically actuated brake mechanism for preventing motion of said plate relative to said negative holder in said second direction, said second brake mechanism being actuated by contact of said fourth stop sensing probe with an energized one of said stops on said second guide bar whereby the effects of momentum in the motion of said plate and said negative holder is overcome and whereby no motion of said carriages can occur in the event of failure of power to said drive motors.

14. In combination with a photocomposer of the class having provision for mounting a photographic negative holder and provision for mounting a sensitized printing plate and first and second electrically driven means for effecting relative movement between said holder and said plate in each of two perpendicular directions and further having a light source positioned to project light through said negative holder onto said plate, an automatic control system comprising a pair of linear guide bars, a first plurality of stops clampable at selected points along the length of a first of said guide bars which points correspond to a proposed positioning of images along the length of said plate, each of said first plurality of stops having an electrically energizable element, a second plurality of stops clampable at selected points along the length of the second of said guide bars which points correspond to a proposed positioning of said images across the width of said plate, each of said second plurality of stops having an electrically energizable element, a first and a second receiver for mounting said first and second guide bars on said photocomposer, an electrical power supply, a first multiple position switch having a plurality of settings each connecting said power supply with at least one of a plurality of terminals, a plurality of conductors for connecting said terminals of said first switch with at least one of said stops on each of said guide bars which pair of stops connected to the energized terminals at any setting of said switch are those indicative of the proposed position of the same image on said plate, a first stop detector adapted to travel along said first guide bar in synchronism with relative movement between said holder and said plate in a first of said directions and having means detecting an energized one of said stops on said first guide bar, a second stop sensing element adapted to travel along said second guide bar in synchronism with said relative movement in the second of said directions and having means detecting an energized one of said stops on said second guide bar, a first relay acting to interrupt operation of said first electrically driven means upon detection of an energized stop by said first stop sensing element, a second relay acting to interrupt operation of said second electrically driven means upon detection of an energized stop by said second stop sensing element, and a second multiple position switch having a first setting in which said first and second motor driven means are actuated and having an additional setting at which said light source is energized.

15. Means for recording the position of images in an arrangement thereof for subsequent use in reproducing said arrangement of images on a printing plate through the use of a photocomposing machine, said means comprising a layout table of the class having a surface on which said arrangement of images can be made and having a straight edge movable across said surface in constant parallelism with a first boundary thereof, a linear inelastic guide bar at least equal in length to said arrangement of images as measured along a second boundary of said surface which second boundary is perpendicular to said first boundary, a fixture on said layout table for mounting said guide bar thereon in parallel alignment with said second boundary of said surface, a plurality of stops for marking points along the length of said guide bar which points correspond to the positioning of images in said arrangement thereof as measured along said second boundary and as fixed through the use of said straight edge, a plurality of clamping elements for securing said stops on said guide bar at said positions thereon whereby said guide bar can be removed from said layout table and utilized to control operation of said photocomposing machine to duplicate said arrangement of images on said printing plate, each of said stops being provided with an electrically energizable element, an electrical power supply, a multiple position switch selectively connecting said power supply with any of a plurality of terminals, a plurality of conductors for selectively connecting individual ones of said stops with individual ones of said switch terminals, and a plurality of indicator means giving a visual indication of the passage of current to a particular one of said stops whereby said switch can be set to energize and identify a particular one of said stops indicative of the position of a particular one of said images in said arrangement thereof.

16. In combination with a layout table of the class having a rectangular surface on which an arrangement of images can be made and having a first straight edge mounted to travel across said surface in parallelism with one boundary thereof and having a second straight edge mounted to travel across said surface at right angles to said first straight edge, apparatus for identifying and recording the position of images in said arrangement thereof for subsequent use in the operation of a photocomposer to duplicate said arrangement of images on a printing plate, which apparatus comprises a pair of guide bars, a first and second receiver means on said layout table for mounting said guide bars thereon, said first receiver means providing for the alignment of said first guide bar normal to said first straight edge and said second receiver means providing for the alignment of said second guide bar normal to said second straight edge, a first plurality of stops slidable along said first guide bar to positions corresponding to the positions of individual ones of said images in said arrangement thereof as measured along said guide bar and as determined through the use of said first straight edge, a second plurality of stops slidable along said second guide bar to positions corresponding to the positions of said individual ones of said images as measured along said second guide bar and as determined through the use of said second straight edge, a plurality of clamping devices for securing said stops at said positions on said first and second guide bars whereby said guide bars may be removed from said layout table and may be subsequently utilized to control operation of said photocomposer to duplicate said layout of images on said printing plate, each of said first and second pluralities of stops being provided with an electrical contact, an electrical power supply, a multiple position switch for electrically connecting said power supply with any of a plurality of terminals, a first multiple channel electrical connector having a first separable portion attached to said first guide bar and having a second portion separable therefrom, a second multiple channel electrical connector having a first portion attached to said second guide bar and having a second portion separable therefrom, a first plurality of conductors each for connecting an individual one of said first plurality of stops with an individual one of said switch terminals through said first multiple channel connector, a second plurality of conductors each for connecting an individual one of said second plurality of stops with one of said switch terminals, a plurality of indicator means for indicating the passage of current through any of said first and second pluralities of conductors, a first electrical contact carried by said first straight edge in position to sweep across said stops on said first guide bar and to make contact with said electrical contacts thereof, a second electrical contact carried by said second straight edge in position to sweep across said stops on said second guide bar, and additional conductor means connecting said first and second contacts on said first and second straight edges with said power supply whereby said switch may be set to energize particular ones of said stops and whereby exact coincidence of said energized stops with said movable straight edges to record the position of images in said arrangement is determined by the closing of the circuit through said stops as indicated by said indicator means.

References Cited in the file of this patent

UNITED STATES PATENTS

| | | |
|---|---|---|
| 1,647,246 | Ogden | Nov. 1, 1927 |
| 1,750,294 | Bassist | Mar. 11, 1930 |
| 1,980,287 | Ogden | Nov. 13, 1934 |
| 2,290,292 | Neu | July 21, 1942 |
| 2,418,754 | Brunet | Apr. 8, 1947 |
| 2,614,469 | Hillmer | Oct. 21, 1952 |
| 2,690,696 | Ashton | Oct. 5, 1954 |

FOREIGN PATENTS

| | | |
|---|---|---|
| 339,878 | Great Britain | Dec. 18, 1930 |